J. E. PRUYN.
BALL BEARING.
APPLICATION FILED SEPT. 19, 1916.
1,281,205.
Patented Oct. 8, 1918.
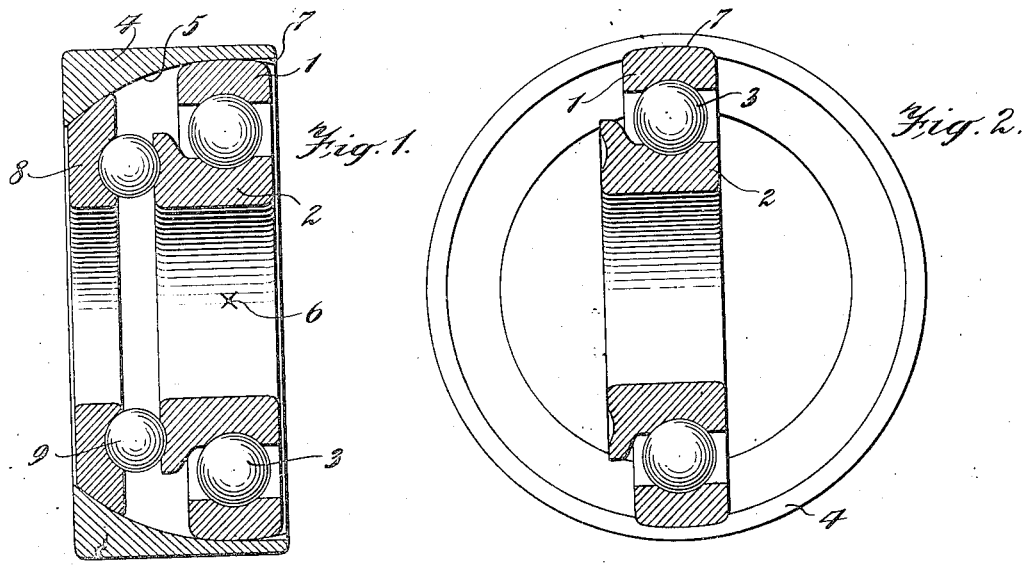
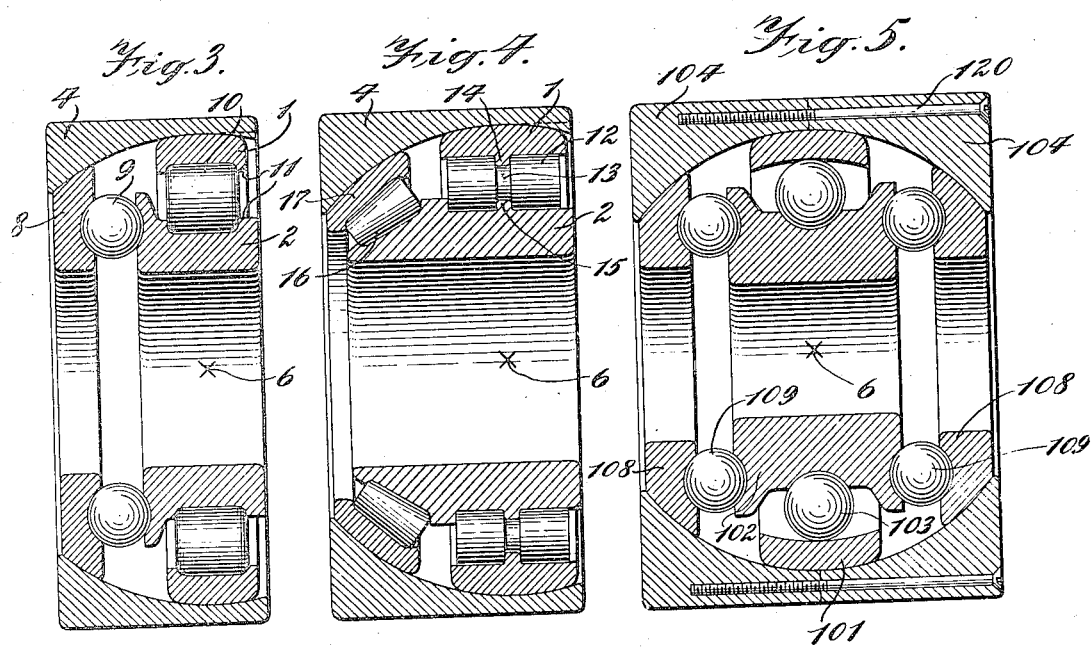
Inventor
John Ernest Pruyn
By his Attorneys
Rosenbaum, Stockbridge & Horst

UNITED STATES PATENT OFFICE.

JOHN ERNEST PRUYN, OF PHILADELPHIA, PENNSYLVANIA, ASSIGNOR OF ONE-HALF TO EMILY C. PRUYN, OF PHILADELPHIA, PENNSYLVANIA.

BALL-BEARING.

1,281,205.

Specification of Letters Patent.

Patented Oct. 8, 1918.

Application filed September 19, 1916. Serial No. 120,993.

*To all whom it may concern:*

Be it known that I, JOHN ERNEST PRUYN, a citizen of the United States, residing at Philadelphia, in the county of Philadelphia and State of Pennsylvania, have invented certain new and useful Improvements in Ball-Bearings, of which the following is a full, clear, and exact description.

My invention relates to anti-friction bearings for machinery, particularly to ball or roller bearings, and especially to combined radial and end-thrust bearings.

The invention has for its objects to provide certain improvements in bearings of the class indicated, all as will appear more fully hereinafter. I have provided a self-adjusting bearing of few parts, of small compass, and which possesses several advantages to be pointed out herein.

My invention consists in certain features of construction and combinations and arrangements of parts, all of which will be fully set forth herein and particularly pointed out in the claims.

In the accompanying drawings,

Figure 1 is an axial section of a bearing made in accordance with my invention;

Fig. 2 is a face view, partly in section showing the manner of introducing the radial bearing into the housing member during the assembling operation; and Figs. 3, 4 and 5 are axial sections of other forms of the invention.

Referring first to the form of the invention illustrated in Figs. 1 and 2, 1 is the outer ring of a radial bearing of which 2 is the inner ring, said rings having raceways in which anti-friction members 3 run, said anti-friction members in this instance consisting of balls. This bearing, consisting of the rings 1 and 2 and the balls 3, is separately assembled in any known or suitable way. After it is assembled, said bearing is inserted, along with other parts presently to be described, in a housing member or ring 4 having its internal surface 5 formed in a zone of a sphere whose center 6 is within the housing, and preferably nearer to one end of said housing than the other. The outer surface of the ring 1 is also spherical and adapted to fit in the housing ring 4. The center 6 being within the housing 4, the opening in said housing is more or less contracted at its ends, and two cut-outs 7 are formed in said housing, diametrically opposite each other, so that the ring 1 can be turned with its plane transverse to the plane of the housing 4 and can then be inserted into or withdrawn from said housing, as shown in Fig. 2. After said ring 1 is inserted in the housing, it can be turned to its operating position shown in Fig. 1. It will be perceived that when the ring 1 is in said operating position, it cannot be withdrawn from the housing ring except by reversing the process by which it was inserted.

An end-thrust bearing ring 8 is seated in the housing 4, in that end of said housing farthest removed from the center 6, and which end of said housing therefore has its opening more contracted than the opposite end. The ring 8 has a convex spherical surface corresponding to the concave surface of the housing, and it has in its side facing the ring 2, a raceway for anti-friction members 9, which in this instance are balls. Said balls run also in a raceway in the inner end of the ring 2. The rings 2 and 8 and the balls 9 constitute an end-thrust bearing.

In assembling the device as a whole, the radial bearing consisting of the rings 1 and 2 and the balls 3 is first assembled and then inserted into the housing by passing the same into and through the cut-outs 7. When fully inserted this radial bearing is capable of swinging movement in all directions and it is turned until the raceway groove in the end of the ring 2 faces outwardly. The balls 9 are then placed on the ring 2 and the ring 8 is placed on the balls 9, and the whole assemblage is held together by any suitable means. It is then turned into said housing until the different elements of the bearing are brought into their operating relations shown in Fig. 1. When the whole bearing is thus assembled, it is retained in that condition by the form of the parts. The ring 8 cannot move to the left in Fig. 1, owing to the spherical form of the housing 4, and the ring 1 cannot be moved out of place to the right for a similar reason.

The form of the invention shown in Fig. 3 is similar in all respects to that shown in Figs. 1 and 2, except that the balls 3 of the radial bearing are replaced by cylindrical rollers 10 and the rings 1 and 2 are formed to coöperate with said rollers. Said rings have flanges 11 to retain the rollers in place.

In Fig. 4 the construction is similar, but the cylindrical rollers 12 of the radial bearing have peripheral grooves 13 which are engaged by annular ribs 14 and 15 on the rings 1 and 2, respectively, to retain said rollers in place. In this figure also the end-thrust bearing has been modified, comprising cone rollers 16. These run on a suitable external conical surface of the ring 2, and on an internal conical surface of the ring 17, which is situated and operates like the rings 8 of the other forms.

In Fig. 5 I have shown a form of my invention adapted to withstand axial thrust in both directions, as well as radial stress. A ring 101 constitutes the outer ring of the radial bearing, and a ring 102 the inner ring, anti-friction members 103 running between said rings. The ring 102 has anti-friction members 109 at both ends thereof, said members coöperating also with end-thrust bearing rings 108. The housing consists of two rings 104 secured together in any suitable way, as by screws 120. The rings 104 when secured together constitute in effect a single housing ring having its internal surface spherical, and the rings 101 and 108 have convex spherical surfaces corresponding to the concave surface of said housing. In this instance the anti-friction members 103 and 109 are shown as balls, but they can be of other forms, as in Figs. 3 and 4. The bearing shown in Fig. 5 is assembled differently from those shown in the other figures, as will be understood. For example, the parts 101, 102, 103, 108 and 109 can be assembled first and held together in any suitable way, and the housing rings 104 can then be placed over them from opposite directions and secured together; or the parts enumerated can be assembled in and on one of the rings 104, after which the other ring can be put in place and the two rings fastened together.

It will be perceived that the bearing adjusts itself automatically to the direction of the shaft, such self-adjustment being about the point 6 as a center, and that in any such adjustment the anti-friction members of the radial bearing occupy a position in a great circle of the sphere in whose surface the inner walls of the housing are formed, so that said members roll on axes parallel to the axis of the shaft and the pressure on them is perpendicular to said axis. In all the forms shown except that illustrated in Fig. 4, the balls 9 and 109 roll, under all conditions of self-adjustment of the bearings, about axes perpendicular to the axis of the shaft, and the pressure on said balls is parallel to the axis of the shaft. The axis of the shaft can stand at a considerable angle to the axis of the housing 4 or 104, without affecting the operation of the bearing in any way. The rings 1 or 101 and 8 or 108 will slide in the housing, about the point 6 as a center, and thus adjust themselves to the axis of the shaft.

The entire inner surface of the housing 4 has been shown as formed upon the zone of a sphere, but this is not essential. A portion of this surface intermediate the ends of said ring is never engaged by either the end-thrust bearing ring 8, or the outer ring 1 of the radial bearing, after the parts of the bearing, as a whole, have been assembled. Such portion may thus be of any shape desired. When, therefore, I refer in the claims to the housing as having a spherical inner surface, it is to be understood that this expression comprehends a construction in which said ring is provided with two spherical portions adjacent the rings 1 and 8, which spherical portions are generated from a common center 6.

It will be perceived that there is nothing about my bearing that is liable to be jammed or gotten out of adjustment by reason of inaccuracy in the construction of the machine in which it is used, or by reason of unskilfulness on the part of the person who assembles said machine.

Various changes can be made in the details of construction and arrangement without departing from my invention.

I claim:

1. In a bearing of the class described, the combination of a housing having a spherical inner surface, an outer radial bearing ring mounted therein, an inner bearing ring, radial anti-friction members between said rings, an end thrust bearing ring mounted in said housing, and anti-friction members between said end thrust bearing ring and said inner ring, the outer radial bearing ring and the other bearing parts within said housing being self-adjusting about the center of the spherical surface thereof.

2. In a bearing of the class described, the combination of a housing having a spherical inner surface, a bearing ring mounted in the spherical concavity of said housing, an inner bearing ring, radial anti-friction members between said rings, an end thrust bearing ring seated in the spherical concavity of said housing, and anti-friction members between said end thrust bearing ring and said inner ring.

3. In a bearing of the class described, the combination of a housing having a spherical inner surface, a bearing ring having a convex spherical surface mounted in said housing, engaging the spherical surface thereof and retained against axial displacement by the curvature of said housing, an inner bearing ring, radial anti-friction members between said rings, an end-thrust bearing ring, seated in the spherical concavity of said housing, and anti-friction members between said end-thrust bearing ring and the end of said inner ring.

4. In a bearing of the class described, the combination of a housing having its inner surface in a zone of a sphere and having cut-outs for the insertion of a bearing ring, a radial bearing ring having a convex spherical surface, an inner bearing ring, radial anti-friction members between the two said rings, an end-thrust bearing ring, and anti-friction members between said end-thrust bearing ring and said inner ring, the construction being such that said outer ring can be inserted in said housing transversely and all of said rings and bearing members can then be turned into position in said housing where they are retained by the curvature of said housing.

5. In a bearing of the class described, the combination of a housing having its internal surface in a zone of a sphere, the equator of said zone being nearer to one end of said housing than to the other, a radial bearing having its outer ring and anti-friction members substantially in said equator, an end-thrust bearing ring seated in the spherical opening in said housing in the end thereof remote from said equator, an inner ring common to the radial and end-thrust bearings, and anti-friction members between said inner ring and said end-thrust bearing ring.

6. In a bearing of the class described, the combination of a housing ring having its inner wall in the surface of a single sphere, the center of which is within the housing, and an anti-friction bearing mounted in said housing and self-adjusting about said center, said bearing comprising an outer radial bearing ring and anti-friction members substantially in the equator of said sphere, an end-thrust bearing ring seated in said housing at a sufficient distance from said equator to allow of its being self-adjusting, an inner bearing ring, and anti-friction members between said inner ring and said end-thrust ring, said housing extending a sufficient distance beyond said equator to retain said outer radial bearing ring in place.

7. In a bearing of the class described, the combination of a radial bearing comprising an outer ring and an inner ring with a grooved raceway in each and anti-friction members in said raceways, the whole constituting a structure that can be assembled as a separate unit and will be self-retained in assembled condition by the engagement of the balls in the grooved raceways, a housing in which said radial bearing can be mounted, and a self-adjusting end-thrust bearing in said housing.

8. In a bearing of the class described, the combination of an outer radial bearing ring, an inner ring, anti-friction members between the two said rings, an end-thrust bearing ring, anti-friction members between said end-thrust bearing ring and said inner ring, and a housing having a concave interior opening more or less contracted at both ends and having cut-outs at one end to admit said outer radial bearing ring edgewise, the construction being such that the whole assemblage of radial and end-thrust rings and bearing members can then be turned into position in said housing.

9. In a bearing of the class described, the combination of a housing having a spherical inner surface and a combined radial and end thrust bearing mounted and self adjusting in said housing and comprising an outer radial bearing ring and an inner radial bearing ring, said rings having grooved raceways formed thereon and anti-friction members in said raceways and constituting a structure which is self-retained in assembled position by the engagement of the balls in said grooved raceways, an end thrust bearing ring in said housing, and anti-friction members between said end thrust bearing ring and said inner radial bearing ring, said end thrust bearing ring engaging the spherical inner surface of the housing.

In witness whereof, I subscribe my signature, in the presence of two witnesses.

JOHN ERNEST PRUYN.

Witnesses:
WM. M. STOCKBRIDGE,
WALDO M. CHAPIN.